Dec. 7, 1954 E. P. HARRIS 2,696,239
DEVICE FOR APPLYING END RINGS TO HOSE OR THE LIKE
Filed Dec. 27, 1950 2 Sheets-Sheet 1
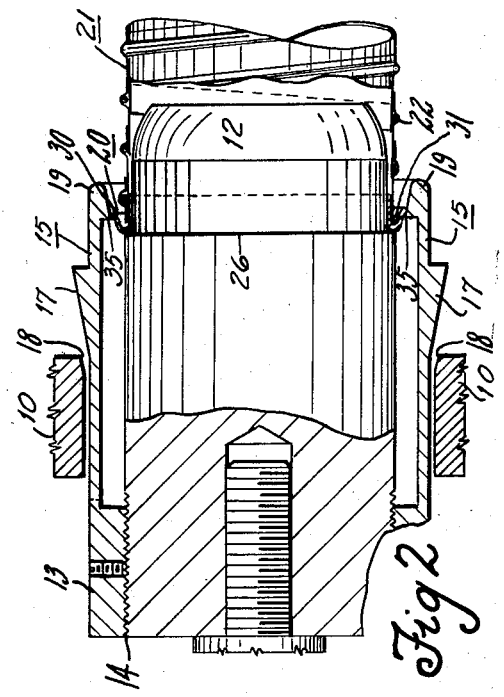
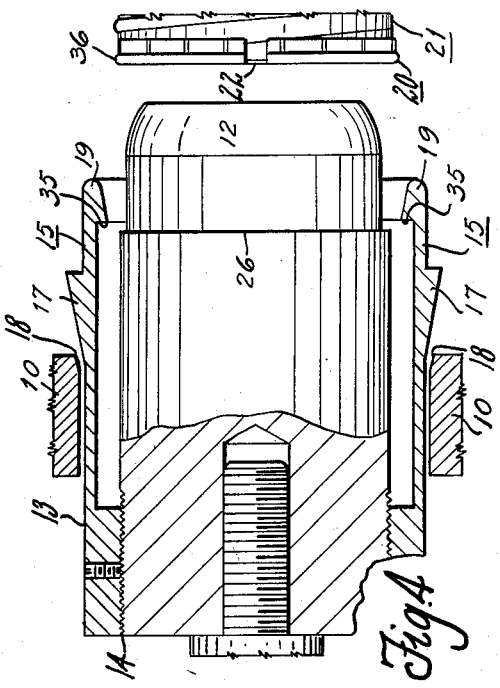
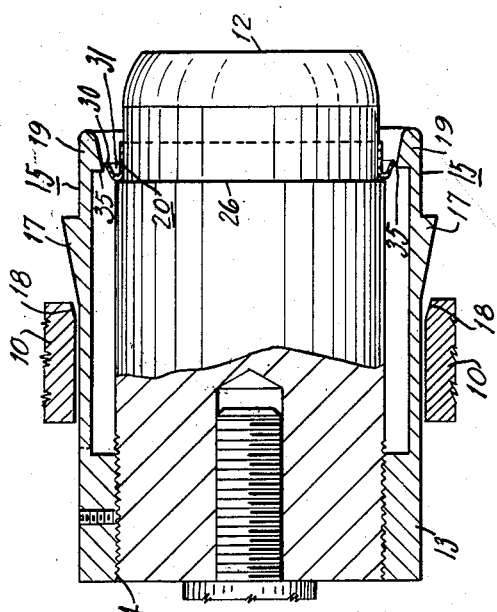
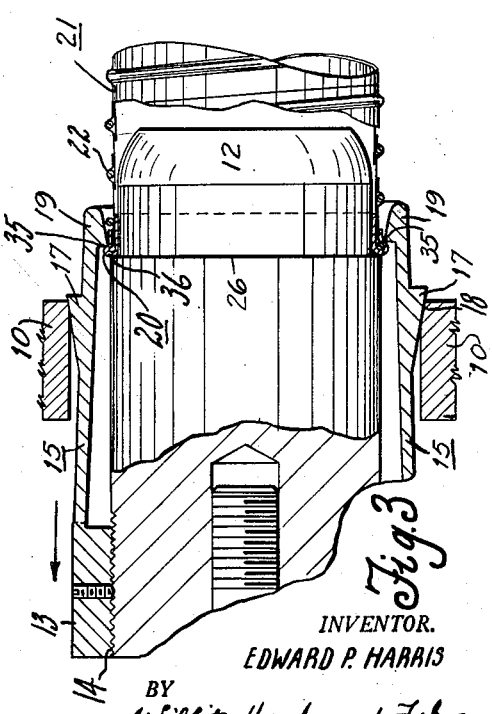
INVENTOR.
EDWARD P. HARRIS
BY
Willits Hardman & Fehr
HIS ATTORNEYS Dec. 7, 1954  E. P. HARRIS  2,696,239
DEVICE FOR APPLYING END RINGS TO HOSE OR THE LIKE
Filed Dec. 27, 1950  2 Sheets-Sheet 2
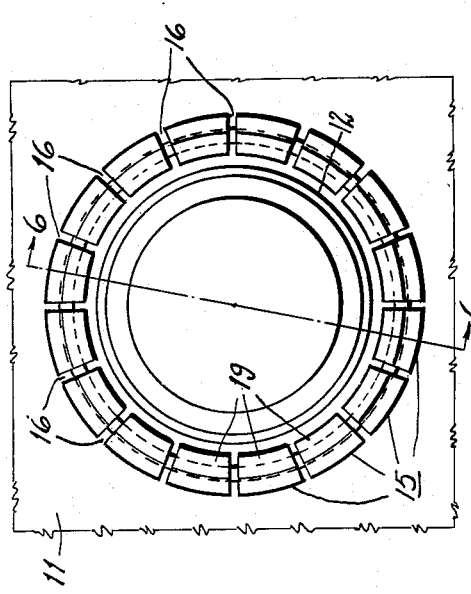
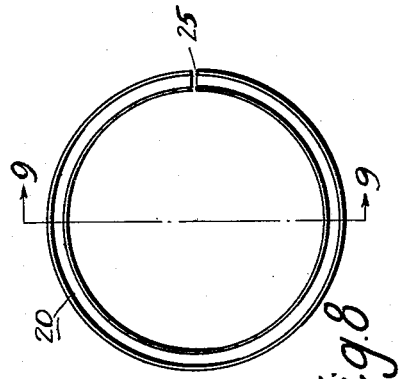
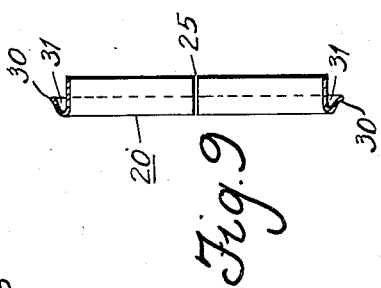
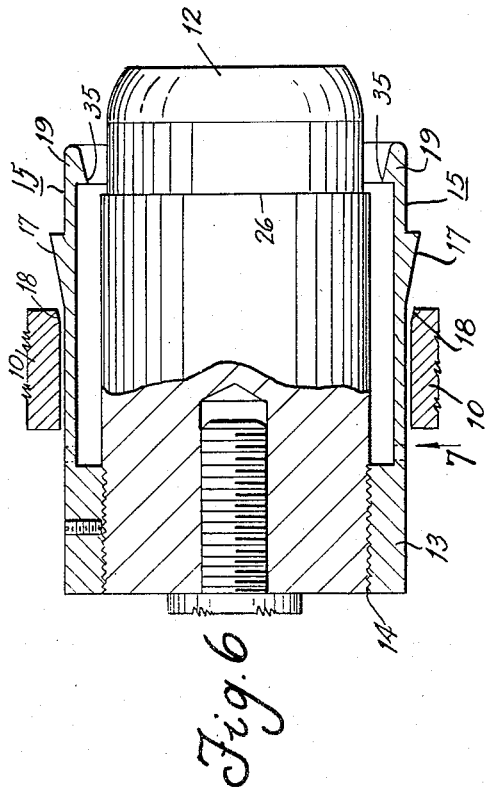
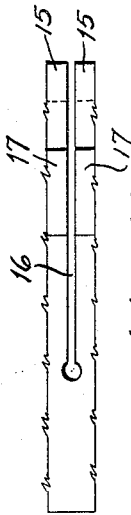
INVENTOR.
EDWARD P. HARRIS
BY
Willits Hardman & Felr
HIS ATTORNEYS

United States Patent Office 2,696,239
Patented Dec. 7, 1954

2,696,239

DEVICE FOR APPLYING END RINGS TO HOSE OR THE LIKE

Edward P. Harris, Dayton, Ohio, assignor to General Motors Corporation, Detroit, Mich., a corporation of Delaware Application December 27, 1950, Serial No. 202,883

1 Claim. (Cl. 153—1)

This invention relates to an apparatus and method for securing metal end rings to the unfinished ends of a length of flexible hose of the type commonly used as air hose for conducting warm air in automotive vehicle bodies, for instance, defroster hose. Such flexible hose is ordinarily made in long lengths and later cut off into the desired shorter lengths suitable for the particular installation in which the hose is to be used. Now according to this invention expansible metal ferrules or reinforcing rings are fixed to the normally unfinished cut ends of the hose to reinforce the hose material at the ends thereof and so facilitate the telescoping of the hose ends over connecting pipes or the like.

An object of this invention is to provide an efficient and simple apparatus and method for fixing such metal finishing rings to the ends of a flexible hose.

Further objects and advantages of the present invention will be apparent from the following description, reference being had to the accompanying drawings wherein a preferred embodiment of the present invention is clearly shown.

In the drawings:

Figs. 1 to 4 inclusive illustrate the method of operation of the apparatus of this invention.

Fig. 1 shows the partially formed metal end ring in place and the parts in open position ready to receive the hose end upon which the end ring is to be clamped.

Fig. 2 is similar to Fig. 1, but shows the hose end slipped into place against the uncrimped end ring.

Fig. 3 shows the next step in the method of crimping the end ring tightly upon the inserted hose end.

Fig. 4 shows the parts returned to their open positions shown in Fig. 1 to permit the withdrawal of the finished hose end with the metal end ring secured thereto (as shown at the right side of Fig. 4).

Fig. 5 is a front end view of the apparatus with no work therein.

Fig. 6 is a longitudinal section taken on line 6—6 of Fig. 5.

Fig. 7 is a fragmentary view looking in the direction of arrow 7 of Fig. 6, and shows the shape of one of the sixteen dividing slots which form the relatively narrow crimping fingers.

Fig. 8 is a face view of the partially formed metal end ring, as inserted in place in the apparatus.

Fig. 9 is a section taken on line 9—9 of Fig. 8.

Similar reference characters refer to similar parts throughout the several views.

10 designates a stationary cam ring member which is suitably mounted upon a stationary supporting frame 11.

Axially located within cam ring 10 is reciprocating central unit comprising the mandrel member 12 and the encircling sleeve 13 fixed thereto by screw threads 14. Sleeve 13 has integral therewith in the form of an annulus radially spaced from mandrel 12 a series of spring fingers 15 which are peripherally spaced from one another by the longitudinal slots 16. Each spring finger 15 has an outwardly projecting cam 17 thereon which rides upon the stationary cam surface 18 of cam ring 10 and so all the spring fingers 15 are flexed uniformly radially when said fingers move to the left (as viewed in Fig. 6) from their positions shown in Fig. 6. Fingers 15 each has a shoulderer crimping head 19 at its outer end which closes radially inwardly toward the mandrel 12 (when its cam 17 rides upon the cam ring 10) while the spacing slots 16 permit the crimping heads 19 to move closer together as the annulus effectively formed thereby is reduced in diameter.

Figs. 1 to 4 inclusive illustrate the use of this apparatus to tightly clamp the partially formed metal end ring 20 shown in Figs. 8 and 9, to the end of a piece of flexible hose 21. Hose 21 as here shown is a helically wrapped rubberized textile tape having a reinforcing helically wrapped wire 22 imbedded therein. End ring 20 is preformed, to the section shown in Fig. 9, of sheet metal, preferably either aluminum or zinc-plated steel, and is split at 25 so that it is yieldably expandible in diameter.

In operation, end ring 20 is first slipped snugly over the end of mandrel 12 to the position shown in Fig. 1, where it abuts shoulder 26 of mandrel 12 and where its outwardly flaring flange 30 overlaps the adjacent crimping heads 19 on the spring fingers 15. Next, the unfinished end of hose 21 is snugly slipped over the mandrel 12, preferably by a pushing and twisting motion, until its annular end surface is seated snugly within the annular channel 31 of end ring 20, as shown in Fig. 2. About one third of the length of the endmost turn of the reinforcing wire 22 is normally seated at the bottom of channel 31 due to the assembling endwise pressure upon hose 21 which forces the normally helical shape of said endmost turn of wire 22 to spring into a more direct turn and so lie within channel 31 for a substantial length of said endmost turn.

The parts of the apparatus and the work being in position as shown in Fig. 2, the central reciprocating unit comprising mandrel 12 and spring fingers 15 is moved to the left (as viewed in Fig. 2) relative to the stationary cam ring 10 to cause the cams 17 riding on the annular cam surface 18 of cam ring 10 to flex all the spring fingers 15 uniformly inwardly and thereby force the crimping heads 19 to very evenly and uniformly crimp the outwardly flaring flange 30 of end ring 20 over the inserted end of hose 21, as shown in Fig. 3. As this crimping is done the split 25 permits ring 20 either to contract or expand slightly in diameter to more readily accommodate the flow of metal during the crimping operation. The points 35 on the crimping heads 19 are shaped to crimp the metal of the outer flange 30 sharply around the endmost turn of the reinforcing wire 22 over a substantial length of said turn (as shown in Fig. 4), and also form a similarly shaped bead 36 in end ring 20 at other portions of its periphery where wire 22 is not enclosed by ring 20 due to its helical pitch. Thus end ring 20 is very strongly attached to the hose 21 and provides a protective flexible slightly expansible coupling member for the end of the hose.

After the above described crimping operation the central reciprocating unit is moved back to its initial position and the spring fingers 15 spring outwardly, as shown in Fig. 4, to permit the withdrawal of the crimped end ring together with hose from the end of mandrel 12. The hose and ring may be readily removed from the short mandrel 12, preferably by a twisting action, due to the flexibility and resilient expansibility of the finally crimped end rim 20.

While the embodiment of the present invention as herein disclosed, constitutes a preferred form, it is to be understood that other forms might be adopted.

What is claimed is as follows:

An apparatus adapted for crimping and beading portions of a channel section metal ring over the annular end of a hose comprising, in combination, a mandrel having a nose portion and a body portion of greater diameter than the nose portion for forming a step therebetween, said nose portion being of a diameter adapted to receive and support said hose and to serve as an anvil backing for the metal ring, said step functioning as a stop for positioning the hose and ring with respect to the mandrel, a series of spring biased forming fingers mounted on said mandrel and arranged in spaced relation peripherally thereof, said fingers each having an individual crimping and beading means thereon longitudinally spaced a predetermined distance relative to said step and adapted to move radially inwardly toward the nose portion of said mandrel for contacting portions of the metal ring and for forming a bead thereon and substantially simultaneously crimping said ring around the inserted annular hose, camming surfaces on each of said fingers, and a cam ring surrounding said fingers and arranged to engage said cams when forced toward said nose portion for causing the fingers to move radially inwardly concurrently for accomplishing said crimping and beading operation.

References Cited in the file of this patent

UNITED STATES PATENTS

| Number | Name | Date |
|---|---|---|
| 1,782,219 | Wallace | Nov. 18, 1930 |
| 1,996,982 | Sprague et al. | Apr. 9, 1935 |
| 2,211,622 | Hunziger | Aug. 13, 1940 |
| 2,231,278 | Miller | Feb. 11, 1941 |
| 2,258,919 | Wallace | Oct. 14, 1941 |
| 2,324,501 | Geist | July 20, 1943 |
| 2,328,639 | Gaertner | Sept. 7, 1943 |
| 2,337,366 | Beck | Dec. 21, 1943 |
| 2,338,666 | Nelson | Jan. 4, 1944 |
| 2,399,790 | Conroy | May 7, 1946 |
| 2,483,659 | Miller | Oct. 4, 1949 |
| 2,486,830 | Farrar et al. | Nov. 1, 1949 |